(12) United States Patent
Erez (10) Patent No.: US 12,425,507 B2
(45) Date of Patent: Sep. 23, 2025

(54) SYSTEMS AND DEVICES FOR PROTECTING PRIVACY OF A USER OF A MOBILE DEVICE

(71) Applicant: Cirotta Tech Ltd, Tel Aviv (IL)

(72) Inventor: Shlomo Erez, Tel Aviv (IL)

(73) Assignee: Cirotta Tech Ltd, Tel Aviv (IL)

( * ) Notice: Subject to any disclaimer, the term of this patent is extended or adjusted under 35 U.S.C. 154(b) by 0 days.

(21) Appl. No.: 17/927,461

(22) PCT Filed: May 26, 2021

(86) PCT No.: PCT/IL2021/050624
§ 371 (c)(1),
(2) Date: Nov. 23, 2022

(87) PCT Pub. No.: WO2021/240523
PCT Pub. Date: Dec. 2, 2021

(65) Prior Publication Data
US 2023/0171338 A1    Jun. 1, 2023

Related U.S. Application Data

(60) Provisional application No. 63/029,727, filed on May 26, 2020.

(51) Int. Cl.
*H04M 1/68* (2006.01)
*H04M 1/72457* (2021.01)
(52) U.S. Cl.
CPC ......... *H04M 1/68* (2013.01); *H04M 1/72457* (2021.01)

(58) Field of Classification Search
CPC .... H04M 1/68; H04M 1/72457; H04M 1/185; H04M 1/70; G10K 11/175; H04K 3/82; H04K 3/822; H04K 3/825; H04K 3/36; H04K 2203/00; H04K 2203/12
See application file for complete search history.

(56) References Cited

U.S. PATENT DOCUMENTS

| 7,610,384 B1 * | 10/2009 | Schulzrinne | H04L 69/16 709/227 |
| 7,756,478 B2 | 7/2010 | Eisenbach | |
| 8,670,566 B2 | 3/2014 | Kirkup et al. | |
| 9,621,526 B2 | 4/2017 | Abrahamson | |
| 10,291,591 B2 | 5/2019 | Yu et al. | |
| 10,637,651 B2 | 4/2020 | Young et al. | |
| 2010/0080084 A1 * | 4/2010 | Chen | G01S 11/14 367/118 |
| 2015/0236743 A1 | 8/2015 | Kennedy | |
| 2015/0269835 A1 * | 9/2015 | Benoit | H04M 19/04 340/539.13 |

(Continued)

FOREIGN PATENT DOCUMENTS

| CN | 102752434 A | 10/2012 |
| CN | 105047191 A | 11/2015 |
| EP | 2175580 A1 | 4/2010 |

*Primary Examiner* — Angelica Perez
(74) *Attorney, Agent, or Firm* — Ballard Spahr LLP (57) ABSTRACT

One or more data protection systems are configured to be mounted on a mobile device, the data protection system being configured and operable for protecting privacy of a user of the mobile device, by preventing remotely obtaining, from the mobile device, data indicative of surroundings of the mobile device including at least one of audio data, visual data and location data.

18 Claims, 5 Drawing Sheets

(56) References Cited

U.S. PATENT DOCUMENTS

| | | |
|---|---|---|
| 2016/0234356 A1* | 8/2016 | Thomas ................. H04K 3/84 |
| 2016/0366115 A1 | 12/2016 | Khalid et al. |
| 2017/0099274 A1 | 4/2017 | Khalid et al. |
| 2017/0180984 A1* | 6/2017 | Thomas ............... H04M 1/667 |
| 2018/0014145 A1 | 1/2018 | Seaman |
| 2018/0277086 A1 | 9/2018 | Soffer |
| 2019/0147175 A1* | 5/2019 | Varerkar ............. G06V 10/764 |
| | | 726/26 |
| 2021/0036729 A1* | 2/2021 | Fong ............. H04M 1/724092 |

* cited by examiner

SYSTEMS AND DEVICES FOR PROTECTING PRIVACY OF A USER OF A MOBILE DEVICE

TECHNOLOGICAL FIELD

The present invention is in the field of mobile devices and relates specifically to protecting a user of the mobile device against obtaining data by taking control of device's various sensors.

BACKGROUND

In today's world, in which mobile devices, such as cellphones, smartphones or tablets, have become a must-have device in most societies and are increasingly loaded with technological advancements that affect various aspects of our lives, privacy has become a major concern for most people when it comes to using their mobile devices. For enhancing security and privacy of users, top smartphone manufacturers are investing huge amounts on the operating system, software and firmware fronts. Nevertheless, hackers are out there to try and remotely take control of the smartphone hardware, such as the device's microphone(s) and/or camera(s), in order to acquire data about surroundings of device, eavesdrop, hear and/or watch the user's conversations and activities. When hackers succeed, it will not be possible to protect the user by software-derived solutions anymore.

GENERAL DESCRIPTION

The present invention provides techniques for protecting privacy of a user of a mobile device even if a remote hacker takes control of one or more of the device's sensors. Such sensors include one or more of the following: audio sensors (microphones), optical sensors (cameras), location sensors (e.g., GPS).

The invention aims to give mobile devices affordable, easy to use and above all efficient solutions, so people can use their mobile devices without fear of someone watching or listening to them via their own mobile devices.

Today, even the best protection layers, provided by the cellphone manufacturers whether on the operating system front, software or hardware fronts, are being hacked. Therefore, inside protection, provided on the operating system and software and hardware, will not be sufficient if hackers succeed to take control of the device. The present invention provides systems and devices that insure protecting the user's privacy by providing external protection that is effective even if the inside protection is violated.

In this application, a mobile device should be interpreted broadly and it includes any device that has networking capabilities such that it can be accessed remotely. This includes cellphones, smartphones, tablets, mini computers and any other smart device or computing device that also has at least one of the following: audio sensor(s) (microphone(s)) for collecting audio/sound from the surroundings (including human voices), optical sensor(s) (camera(s)) for collecting images and/or videos of the surroundings, location sensor(s) (GPS antenna) for collecting location-based signals from a location determination system (such as GPS.

In a broad aspect, a data protection system configured to be mounted on the mobile device is provided, the data protection system is configured for selectively protecting privacy of a user of the device, under remote control/hacking of the device's software and/or hardware, and specifically when the mobile device is not in use by the user, by preventing obtaining/stealing data originating from surroundings of the device including at least one of audio data, visual data and location data.

According to the present invention, in one specific example, a protective case of the mobile device, configured to be mounted on the mobile device, may include the data protection system being mounted thereon or integrated therein.

The present invention enables the users to safely conduct their affairs without fear of someone else listening to them or watching them through their own smartphones. Conversations and meetings can now be done freely and securely without the need to shut off smartphones or leave them entirely outside of the meeting room.

In a first aspect, the data protection system is configured for preventing obtaining the audio data originating from the surroundings, e.g. preventing eavesdropping, the data protection system comprises an ambient audio data protection system configured and operable to generate one or more unique, specifically designed, audio signals that is (are) collected by microphone(s) of the mobile device, when the data protection system is mounted on the mobile device, interrupt/interfere with ambient audio in the surroundings of the mobile device being collected by the microphone(s) and prevent isolating the ambient audio in the surroundings from overall audio collected by the microphone(s).

The data protection system and/or the ambient audio data protection system may comprise a processing unit configured and operable to generate one or more digital signals causing the ambient audio data protection system to generate the one or more specifically designed audio signals. The one or more digital signals are configured to control at least one of amplitude, frequency and phase of the one or more emitted audio signals. The specifically designed audio signal generated by the data protection system interferes with the other ambient audio signals collected by the microphones of the mobile device and prevents detecting from a remote location what is said/heard in the vicinity of the mobile device.

The ambient audio data protection system can be configured and operable to generate the one or more audio signals being unrecognized/undiscernible by individual(s) in vicinity of the mobile device. The ambient audio data protection system may be configured to emit audio signals that are not registered by human hearing, including the device's user's hearing, either since the frequency(ies) emitted are not in the range of frequencies that can be registered by the human ear or since the volume (amplitude) of the audio signal is low enough. Additionally or alternatively, the placement of the ambient audio data protection system and/or direction of the emitted audio signals is such that it is hard to be recognized/discernible by the existing individual(s).

In some embodiments, the ambient audio data protection system comprises one or more acoustic elements (e.g. speakers) each being located in a vicinity of at least one of the microphone(s) of the mobile device when the data protection system is mounted on the device. The ambient audio data protection system, through the processing unit, can be configured to emit different specifically designed audio signals through the different acoustic elements such that each microphone of the mobile device is subjected to a different specifically designed audio signal, thereby increasing variability between the different audio signals collected by the different microphones and minimizing risk of isolating the ambient audio in the surroundings from the overall collected audio in each microphone.

In some embodiments, the ambient audio data protection system comprises a central acoustic element configured to generate the one or more specifically designed audio signals, and at least one audio channel extending from the central acoustic element and terminating in vicinity of at least one of the microphone(s) of the mobile device, the at least one audio channel being configured to transmit the one or more audio signals generated by the central acoustic to the vicinity of the at least one of the microphone(s) of the mobile device. Audio "channel" as used herein describes both a physical audio canal or wave guide, and any other structure capable of transmitting audio from one point to another. In other words, the data protection system will have a central unit which includes a central acoustic element that emits an audio signal which travels through type-specific audio channels to reach the device's microphones and interrupt eavesdropping. The central unit may also include a central power unit that provides the needed power to drive the central acoustic element. This allows a universal design of the data protection system enabling to change only the design of the audio channels to meet the design and location of microphones on specific smartphone models/brands while keeping the central unit identical for all, thus greatly reducing manufacturing costs.

In some embodiments, when each acoustic element of the ambient audio data protection system is coupled to one or more adjacent microphones, the acoustic element and the microphone(s) are located within an acoustic cell that is designed and configured to enable proper function of the microphone(s) when the ambient audio data protection system is deactivated, and on the other side amplify the specifically designed audio signals emitted towards the microphone(s), thereby enabling to keep the specifically designed audio signals at low volume.

In some embodiments, when an audio channel is provided to transfer the specifically designed audio signals from an acoustic element to a microphone, the audio channel is structured and/or includes an acoustic material that amplifies the specifically designed acoustic signals along the way.

In some embodiments, the specifically designed audio signals are configured to include one or more frequencies corresponding to the frequencies of human voice, thereby preventing a third party from isolating the ambient audio in the surroundings from the overall audio signals collected by the microphone.

When mounting/integrating the data protection system on/in a device protective case, the case can be modular and configurable to be universal to match a plurality of models of the mobile device. In some embodiments, the case comprises a universal central part configured to be attached to a central portion of any one of the plurality of models of the mobile device, and at least one top part and at least one bottom part configured to attach to a single mobile device of the plurality of models of the mobile device. In some embodiments, the case's central part comprises the central acoustic element, and at least one of the at least one top part and at least one bottom part comprise(s) the at least one audio channel.

In a second aspect, the data protection system is configured for preventing obtaining/stealing the visual data originating from the surroundings, the data protection system comprises at least one shutter element configured to selectively cover one or more camera systems of the mobile device and prevent the camera system(s) from collecting images/videos of surroundings of the mobile device, the at least one shutter element being displaceable between a first position in which it uncovers the one or more camera systems and a second position in which it covers the camera system(s).

One or more uniquely designed shutter elements is(are) designed to cover the mobile device's camera system/lenses either automatically while they are not in use by the owner of the mobile device, or manually by the device's owner.

In some embodiments, the shutter element is mechanically displaceable between said first and second positions.

In some embodiments, the shutter element is electronically displaceable between said first and second positions. In this case, the shutter element can be designed to controllably and automatically move between the first and second positions, and vice versa, by providing sensing data of the device's condition (idle or under use), to the data protection system.

In some embodiments, whenever the shutter element is being displaced from the first position to the second position, either manually or electronically, the audio data protection system is automatically activated and vice versa.

In some embodiments, the shutter element carries at least one of an acoustic element and an audio channel, of the ambient audio data protection system, being located or terminated in vicinity of at least one microphone adjacent the camera system, to thereby mask the at least one microphone.

In a third aspect, the data protection system is configured for preventing obtaining the location of the mobile device, the data protection system comprises a location data generation unit configured to selectively generate location signals to be collected by a location determination system of the mobile device, interfere with/block/mask location determination signals received from a remote location data generator and prevent determining the location of the mobile device based on the location determination signals from the remote location data generator. The location data generation unit is located in a close proximity to the location determination system of the mobile device.

The location data generation unit is configured and operable to generate directional, near-field, and weak location signals such that they are collected by the location determination system of the mobile device carrying the data protection system and are not sensed by other systems of the mobile device or location determination systems/other systems belonging to other mobile devices in the vicinity thereof.

In some embodiments, the location data generation unit is configured and operable to generate the location signals being indicative of a constant location, generally different than the actual location of the mobile device. In some embodiments, the location data generation unit is configured and operable to generate the location signals being indicative of a moving location of the mobile device.

The data protection system can have a central power supply unit that feeds any one of the above mechanisms (audio data protection system, visual data protection system, etc.), or it can be that every mechanism or some mechanisms together are fed by a dedicated power supply unit. In both cases, the power supply unit(s) can be based, partially or totally, on battery(ies), either disposable or rechargeable, or it can be based on power provided by the mobile device's internal battery through a power cord connected to a power output of the mobile device.

Each one of the system's mechanisms mentioned above, as partially described above, can be configured for manual or automatic activation and deactivation. The system can be activated by choice, by activating one or more buttons designed for this purpose. The data protection system may comprise an independent sensory system that senses the mobile device condition, whether it is idle or in use, in order to activate and deactivate the several mechanisms. As said, activation of one mechanism, such as the acoustic system, can be automatically dependent on activation of another mechanism, such as the shutter element(s). Alternatively, the data protection system may be configured to connect to internal sensors of the mobile device in order to learn about the device's condition, e.g. via an application that runs on the mobile device and transmits such data between the internal sensor(s) and the external data protection system. For example, while the user's smartphone is not in the ode of an active call, i.e. the user is not currently engaged in a conversation with a second party via the cellular network, one or more of the data protection system will be actively or automatically be activated in order to prevent eavesdropping by sound or by sight by means of emitting unique sound, which is unnoticeable by the human ear, or shutting the smartphone's cameras view.

EMBODIMENTS

1. A data protection system configured to be mounted on a mobile device, the data protection system being configured and operable for protecting privacy of a user of the mobile device, by preventing remotely obtaining data indicative of surroundings of the device including at least one of audio data, visual data and location data.

2. The data protection system according to embodiment 1, being configured for preventing obtaining the audio data originating from the surroundings, the data protection system comprises an ambient audio data protection system configured and operable to generate one or more audio signals that is (are) collected by microphone(s) of the mobile device, interfere with ambient audio in the surroundings of the mobile device being collected by the microphone(s) and prevent isolating the ambient audio from overall audio signal collected by the microphone(s) of the mobile device.

3. The data protection system according to embodiment 2, wherein said ambient audio data protection system is configured and operable to generate the one or more audio signals being undiscernible by individual(s) in vicinity of the mobile device.

4. The data protection system according to embodiment 2 or 3, wherein said ambient audio data protection system comprises one or more acoustic elements each being located in a vicinity of at least one of the microphone(s) of the mobile device when the data protection system is mounted on the mobile device.

5. The data protection system according to embodiment 4, wherein each acoustic element and respective microphone(s) are located within an acoustic cell that is designed and configured to enable proper function of the microphone(s) when the ambient audio data protection system is deactivated, and amplify the audio signals emitted towards the microphone(s), thereby enabling to keep the audio signals at low volume.

6. The data protection system according to embodiment 2 or 3, wherein said ambient audio data protection system comprises a central acoustic element configured to generate the one or more audio signals, and at least one audio channel extending from the central acoustic element and terminating in vicinity of at least one of the microphone(s) of the mobile device, the at least one audio channel being configured to transmit the one or more audio signals generated by the central acoustic element to the vicinity of the at least one of the microphone(s) of the mobile device.

7. The data protection system according to any one of the embodiments 4 to 6, wherein said ambient audio data protection system comprises a processing unit configured and operable to generate one or more digital signals causing the one or more acoustic elements to generate said one or more audio signals, the one or more digital signals control at least one of amplitude, frequency and phase of the one or more audio signals.

8. The data protection system according to any one of the embodiments 2 to 7, wherein said ambient audio data protection system is configured and operable to generate the one or more audio signals in a form of a random noise comprising at least one of random phase, random frequency, random amplitude and random sequence of the audio signal.

9. The data protection system according to any one of the embodiments 2 to 8, wherein said ambient audio data protection system is configured and operable to generate the audio signals including one or more frequencies corresponding to frequencies of human voice.

10. The data protection system according to any one of the embodiments 2 to 9, wherein said ambient audio data protection system is configured and operable to generate different audio signals through respective different acoustic elements such that each microphone of the mobile device is subjected to a different audio signal.

11. The data protection system according to any one of the preceding embodiments, being configured for preventing obtaining the visual data originating from the surroundings, the data protection system comprises at least one shutter element configured to selectively cover one or more camera systems of the mobile device and prevent the camera system(s) from collecting images of surroundings of the mobile device, the at least one shutter element being displaceable between a first position in which it uncovers the camera system and a second position in which it covers the camera system.

12. The data protection system according to embodiment 11, wherein said shutter element is mechanically displaceable between said first and second positions.

13. The data protection system according to embodiment 11, wherein said shutter element is electronically displaceable between said first and second positions.

14. The data protection system according to any one of the embodiments 11 to 13, wherein when the shutter element is displaced from the first position to the second position the ambient audio data protection system is automatically activated and vice versa.

15. The data protection system according to any one of the embodiments 11 to 14, wherein said shutter element carries at least one of an acoustic element and an audio channel, of said ambient audio data protection system, being respectively located or terminated in vicinity of at least one microphone adjacent the camera system.

16. The data protection system according to any one of the preceding embodiments, wherein said data protection system is configured for preventing obtaining the location data, the data protection system comprises a location data generation unit configured to selectively generate location signals to be collected by location determination system of the mobile device, interfere with location determination signals received from a remote location data generator and prevent determining real location of the mobile device from overall location data signal collected by the location determination system of the mobile device.

17. The data protection system according to embodiment 16, wherein said location data generation unit is located in a close proximity to the location determination system of the mobile device and being configured and operable to generate weak, near-field and directional location signals that affect only the location determination system of the mobile device and are undetectable by other mobile devices located within a predetermined distance from the location data generation unit.

18. The data protection system according to embodiment 17, wherein said distance is in range of up to tens of centimeters.

19. The data protection system according to embodiment 17 or 18, wherein power of said location signals is up to +10 dBm.

20. The data protection system according to any one of the embodiments 16 to 19, wherein said location data generation unit is configured to generate the location signals causing the location determination system of the mobile device to determine the location of the mobile device being a constant or a moving location different than the real location.

21. The data protection system according to any one of the preceding embodiments, comprising at least one of a replaceable and a rechargeable battery(ies) for powering one or more parts of the data protection system.

22. The data protection system according to any one of the preceding embodiments, comprising a power cord configured to connect one or more parts of the data protection system to a power source of the mobile device.

23. The data protection system according to any one of the preceding embodiments, being modular and configurable to match a plurality of models of the mobile device.

24. A case configured to be mounted on a mobile device, the case comprising the data protection system of any one of the preceding embodiments.

25. The case according to embodiment 24, comprising a central part configured to be attached to a central portion of the plurality of models of the mobile device, and at least one top part and at least one bottom part configured to attach to a single mobile device of the plurality of models of the mobile device.

26. The case according to embodiment 25, when dependent on embodiment 6, wherein said central part comprises the central acoustic element, and at least one of said at least one top part and at least one bottom part comprise(s) said at least one audio channel.

27. A data protection system configured to be mounted on a mobile device, the data protection system being configured and operable for protecting privacy of a user of the mobile device, by preventing remotely obtaining audio data originating from surroundings of the device, the data protection system comprises an ambient audio data protection system configured and operable to generate one or more audio signals that is (are) collected by microphone(s) of the mobile device, interfere with ambient audio in the surroundings of the mobile device being collected by the microphone(s) and prevent isolating the ambient audio from overall audio signal collected by the microphone(s) of the mobile device.

28. The data protection system according to embodiment 27, being further configured to prevent remotely obtaining audio data originating from surroundings of the device, the data protection system further comprising a visual data protection system comprising at least one shutter element configured to selectively cover one or more camera systems of the mobile device and prevent the camera system(s) from collecting images of surroundings of the mobile device, the at least one shutter element being displaceable between a first position in which it uncovers the camera system(s) and a second position in which it covers the camera system(s).

29. The data protection system according to embodiment 27 or 28, being further configured for preventing obtaining location data indicative of real location of the device, the data protection system comprises a location data protection system comprising a location data generation unit configured to selectively generate location signals to be collected by location determination system of the mobile device, interfere with location determination signals received from a remote location data generator and prevent determining the real location of the mobile device from overall location data signal collected by the location determination system of the mobile device.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
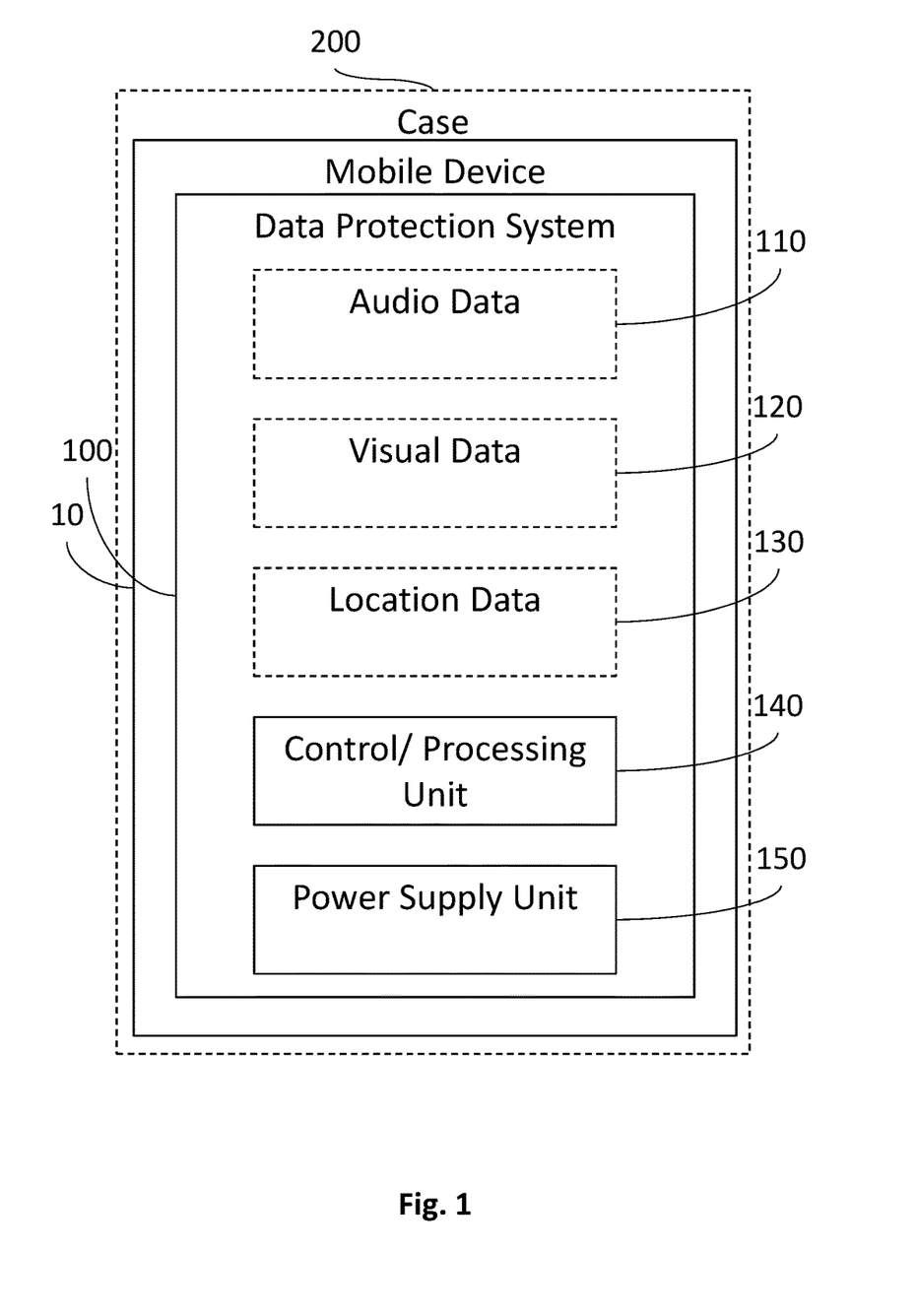
FIG. 1 illustrates, by way of a block diagram, a non-limiting example of a data protection system configured for mounting/attaching on/to a mobile device, to protect the privacy of a user/owner of the mobile device.

Reference is made to FIG. 1 illustrating, by way of a block diagram, a non-limiting example of a data protection system 100 configured for mounting/attaching on a mobile device 10, to protect the privacy of a user/owner of the mobile device 10. Accordingly, the data protection system 100 is an external system configured to be attached to the mobile device housing and it is not an internal system of mobile device. Therefore, the data protection system 100 is universal and can be adapted to the specific mobile device. The data protection system 100 is configured for protecting privacy of a user of the device against remote hacking of the device's software and/or hardware, and specifically when the mobile device is not in use by the user but located therewith.

The data protection system 100 can be adapted to protect the privacy of the device's user and prevent eavesdropping by including one or more of the following sub-systems, depending on the facilities included within the mobile device, as explained above: audio data protecting system 110 aimed at preventing obtaining/stealing audio data originating from surroundings of the device, visual data protecting system 120 aimed at preventing stealing visual data (images/videos) originating from surroundings of the device, location data protecting system 130 aimed at preventing identifying location of the device based on location-based data originating from location of the device. It is noted that the data protection system 100 can include only one, any two or more of the sub-systems above and this depends on the mobile device functionality or on the desired application.

In some embodiments, the data protection system 100, including any sub-system thereof, is configured optionally for mounting on the mobile device by a case 200 configured to be attached to the mobile device. Accordingly, in some embodiments of the invention, as will be exemplified further below, a case configured for mounting on the mobile device, for the purpose of physical protection and/or design matters, includes the data protection system 100 with any combination of the sub-systems.

Being external to the mobile device, the data protection system 100 is designed to be operable totally or partially independently from the mobile device. Therefore, the data protection system 100 has its own control/processing unit(s) and power supply. In some embodiments, the data protection system may depend for its activity on the mobile device facilities, as will be explained herein further below.

As shown, the data protection system 100 includes a control/processing unit 140 configured and operable to control the function(s) of the data protection system 100 and any of the sub-systems. It should be noted that the control/processing unit 140, while being shown as a single unit in the block diagram of FIG. 1, should be interpreted broadly. In some embodiments, a single unified processing unit, as shown, is provided. In some other embodiments, each one of the audio, visual, and location data protection systems has its own processing unit. In some embodiments, some of the audio, visual, and location data protection systems are connected to a single processing unit. Whenever the processing unit is mentioned herein, it can be employed in any one of the above described configurations.

Also, the data protection system 100 includes a power supply unit 150 configured and operable to provide the data protection system 100 and any of the sub-systems with the power needed for executing the different actions. Again, the power supply unit 150, while being shown as a single unit in the block diagram of FIG. 1, should be interpreted broadly. In some embodiments, a single unified power supply unit, as shown, is provided. In some other embodiments, each one of the audio, visual, and location data protection systems has its own power supply unit. In some embodiments, some of the audio, visual, and location data protection systems are connected to a single power supply unit. Whenever the power supply unit is mentioned herein, it can be employed in any one of the above described configurations. In some embodiments, the power supply unit 150 can be a battery. The battery can be disposable (single-use) or rechargeable (reusable). In some embodiments, the power supply unit includes a power cord configured to be connected to a power output of the mobile device and enable feeding the data protection system 100 with power from the internal power unit of the mobile device and/or charging the rechargeable battery of the power supply unit 150 of the data protection system.

It is noted that the data protection system can be protected by one or more protection layers such that its activation and deactivation is possible only by the user/owner or other authorized individual. For example, the data protection system can be protected by a passcode.

Figure 2A:
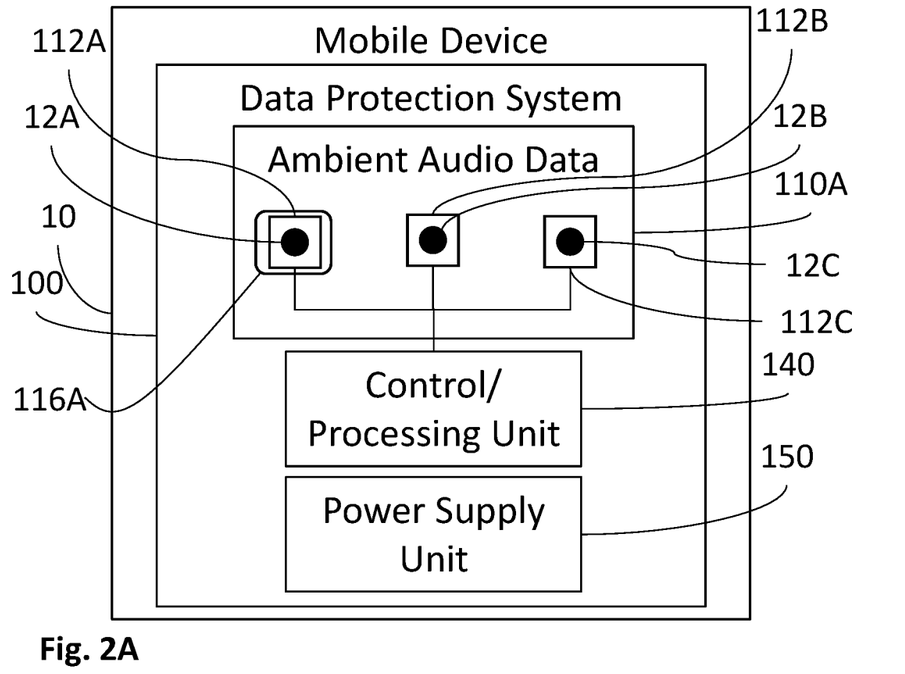
FIGS. 2A-2B illustrate, by a way of block diagrams, two non-limiting examples of the data protection system configured for protecting the privacy of the mobile device's user/owner by preventing a third party taking control remotely of the mobile device from eavesdropping to audio in the surroundings of the mobile device.
Figure 2B:
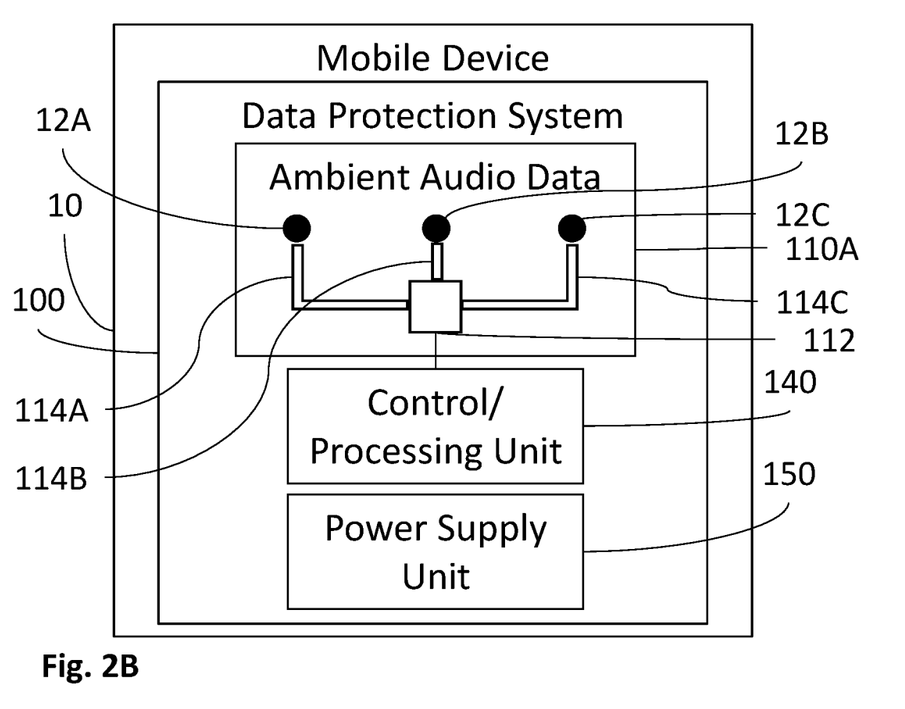

Reference is made to FIGS. 2A-2B illustrating, by a way of block diagrams, the data protection system 100 including the audio data protection system 110 (sometimes referred to herein as the ambient audio data protection system) configured for protecting the privacy of the mobile device's user/owner by preventing a third party taking control remotely of the mobile device from eavesdropping to audio in the surroundings of the mobile device 10, such as a conversation between the user and other(s) taking place near the mobile device and in the range of the microphone(s) of the mobile device.

In some embodiments, the specifically designed audio signals are configured to include one or more frequencies corresponding to the frequencies of human voice, thereby preventing a third party from isolating the ambient audio in the surroundings from the overall audio signals collected by the microphone.

As shown in the non-limiting example of FIG. 2A, the audio data protection system 110 includes one or more acoustic elements (e.g. speakers) configured to be positioned in the vicinity of one or more microphones of the mobile device, the acoustic element(s) is (are) configured and operable to generate acoustic waves/signals to be collected by the microphones of the device. In this specific example, three acoustic elements 112A-112C are placed beside three device's microphones 12A-12C respectively. The acoustic elements 112A-112C are placed near the microphones such that when they are activated to produce acoustic waves they affect the overall audio signal collected by the microphones such that they prevent isolating the ambient audio (the audio originating from the surroundings) from the acoustic signals they produce, and when they are deactivated they enable proper functionality of the microphones. Accordingly, in some embodiments, the acoustic elements are attached to the microphones using specifically designed acoustic material that enables the above. In some embodiments, the acoustic element(s) and the microphone(s) are located within an isolated acoustic cell, for example 116A, that is designed and configured to enable proper function of the microphone(s) when the ambient audio data protection system is deactivated, and on the other side amplify the specifically designed audio signals emitted towards the microphone(s), thereby enabling to keep the specifically designed audio signals at low volume.

The processing unit 140 is configured and operable to produce a random noise signal that is transferred to the acoustic elements that generate corresponding random noise acoustic waves that are collected by the microphones and prevent isolating the ambient audio from the overall audio signal including the random noise and the ambient audio. For example, the random noise is an acoustic signal including a plurality of random frequencies and/or amplitudes and/or phases and/or sequences. In some embodiments, he random noise acoustic waves are configured to cause saturation of the device's microphones preventing them from or minimizing their ability to collect the ambient audio. The random noise is chosen such that it is hardly noticeable/discernible by the device's user and his/her companions. In some embodiments, the ambient audio data protection system 110, possibly through the processing unit 140, is configured to emit different specifically designed audio signals through the different acoustic elements such that each microphone of the mobile device is subjected to a different specifically designed audio signal, thereby increasing variability between the different audio signals collected by the different microphones and minimizing risk of isolating the ambient audio in the surroundings from the overall collected audio in each microphone.

In FIG. 2B, another non-limiting example of the audio data protection system 110 is shown. Here, the audio data protection system 110 includes a single (central) acoustic element 112 located somewhere on the mobile device with one or more audio channels configured and operable to transmit the random noise acoustic waves from the acoustic element 112 to the respective one or more microphones of the mobile device. Again, in this example, three audio channels 114A-114C are configured to transmit the acoustic waves from the acoustic element 112 to the three microphones 12A-12C of the mobile device.

In some embodiments, the audio channel is structured and/or includes an acoustic material that amplifies the specifically designed acoustic signals along the way.

It is appreciated that the above non limiting examples of the audio data protection should not limit the broad aspect of the invention. For example, it can be that a single acoustic element is coupled to more than one microphone of the mobile device if the microphones are in close vicinity to each other. In another example, a single audio channel splits along the way to more than one audio channel each coupled to one or more microphones. In another example, a combination of the examples of FIGS. 2A and 2B can be provided.

The configuration in FIG. 2B can be advantageous in matching the audio data protection system 110 to various models of the mobile device that can have different designs and different locations of the microphones, specifically when the data protection system is mounted on a protective case. The configuration in FIG. 2B enables using a modular case that is configurable to suit various mobile device. In this instance, the case may include a central part configured to be attached to a central portion of the plurality of models of the mobile device, and at least one top part and at least one bottom part configured to attach to one mobile device's model of the plurality of models of the mobile device. The central part accommodates the single acoustic element 112 and the top and bottom parts that match the housing/design of a specific mobile device model accommodate the audio channels that convey the acoustic waves to the respective microphones. This way, the central part of the case is universal while the user replaces only the top and bottom parts whenever he/she changes the mobile device model.

Figure 3:
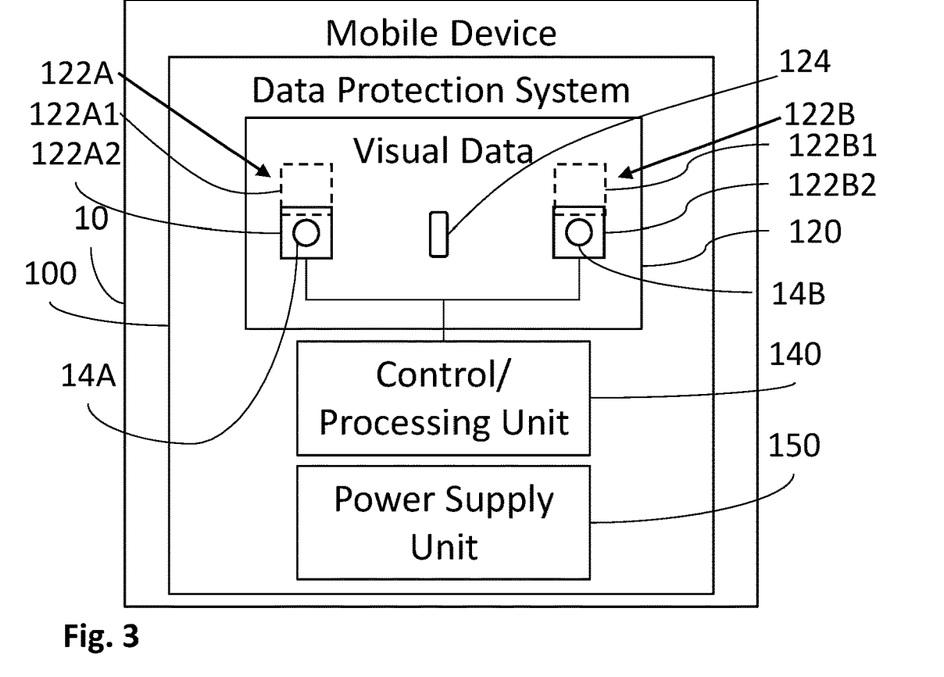
FIG. 3 illustrates, by way of a block diagram, a non-limiting example of the data protection system configured for protecting the privacy of the mobile device's user/owner by preventing a third party taking control remotely of the mobile device from eavesdropping to visual data in the surroundings of the mobile device.

Reference is made to FIG. 3 illustrating, by way of a block diagram, a non-limiting example of the data protection system 100 including the visual data protection system 120 configured for preventing eavesdropping to visual data at the surroundings of the mobile device by taking control of the camera systems of the mobile device. The visual data protection system 120 includes a shutter mechanism configured to selectively cover the camera system(s) of the mobile device and prevent the camera system(s) from collecting images of surroundings of the mobile device. The shutter mechanism includes at least one shutter element configured to cover/uncover one or more camera systems of the mobile device. In one example, a single shutter element is configured to cover/uncover all of the camera systems of the mobile device, e.g. front and back camera systems. In the described non-limiting example, the mobile device includes two camera systems 14A and 14B, e.g. front and back camera systems in a smartphone or tablet, to which two shutter elements 122A and 122B are coupled respectively. The shutter element is displaceable between a first position in which it uncovers the camera system and a second position in which it covers the camera system. As shown, the shutter element 122A is displaceable between a first position 122A1 in which it uncovers the camera system 14A and a second position 122A2 in which it covers the camera system 14A. Similarly, the shutter element 122B is displaceable between a first position 122B 1 in which it uncovers the camera system 14B and a second position 122B2 in which it covers the camera system 14B.

In some embodiments, the shutter element is mechanically displaceable between the first and second positions by hand or by a button (not specifically shown). In some embodiments, the shutter element is electronically displaceable between the first and second positions, e.g. by a switch 124. Each shutter element may have its own button/switch or a common button/switch may control some or all of the shutter elements.

In some embodiments, activating the visual data protection system 120 (when the shutter element is displaced from the first position to the second position) may also activate other included parts of the data protection system 100, such as the audio data protection system 110A, and vice versa. This may be controlled by the control unit(s) 140 that is connected to all included different systems.

In some embodiments, whenever the data protection system 100 includes both of the audio and visual protection systems 110 and 120, and while not specifically shown, at least one shutter element carries at least one of an acoustic element and an audio channel, of the ambient audio protection system, being located or terminated in vicinity of at least one microphone adjacent the camera system, such that when the shutter element is moved to the second position covering the camera system, the acoustic element and/or the audio channel enable preventing eavesdropping to the ambient audio in the surrounding of the mobile device.

Figure 4:
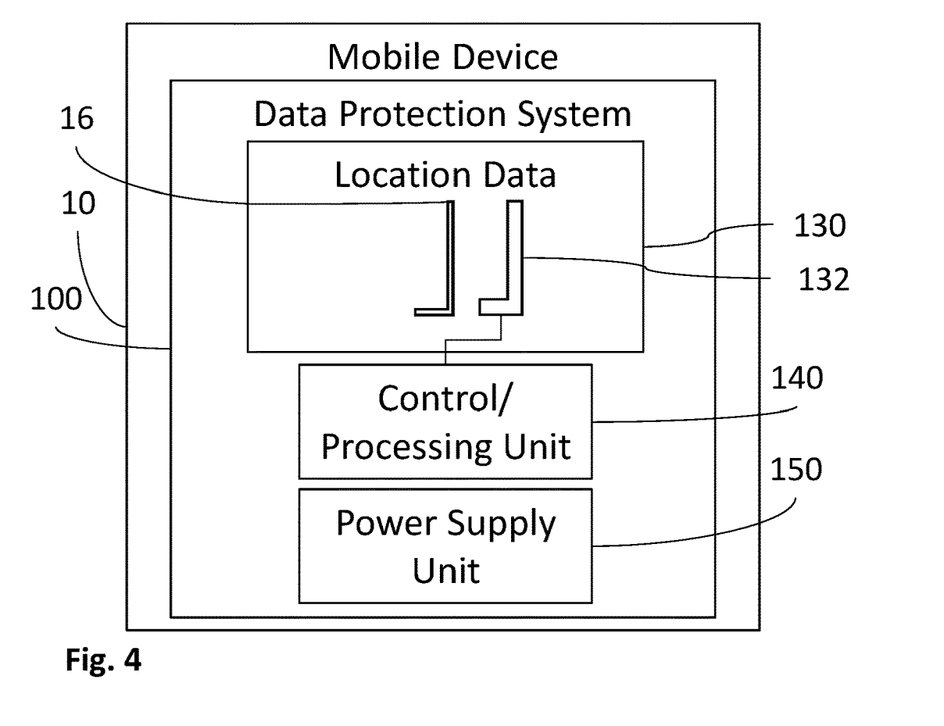
FIG. 4 illustrates, by way of a block diagram, a non-limiting example of the data protection system configured for protecting the privacy of the mobile device's user/owner by preventing a third party taking control remotely of the mobile device from eavesdropping to location of the mobile device.

Reference is made to FIG. 4 illustrating, by way of a block diagram, a non-limiting example of the data protection system 100 including the location data protection system 130 configured for preventing eavesdropping to location data of the mobile device by taking control of the location determination system(s) 16 of the mobile device.

As shown, the location data protection system 130 includes a location data generation unit 132, e.g. a GPS signal generator, configured to selectively generate localized, near-field, directional and weak location (GPS) signals (that do not affect other nearby mobile devices carrying their own location determination systems), to be collected by the location determination system 16 (e.g., a GPS receiver) of the mobile device, when the location data generation unit 132 is attached in close, specifically closest, proximity to the location determination system 16 of the mobile device, interrupt with/block location determination signals received from a remote location data generator (e.g., a GPS generator satellite) and prevent determining the location of the mobile device, specifically prevent isolating the location determination signals from overall location data signal collected by the location determination system 16 of the mobile device.

In some embodiments, the location data generation unit is configured and operable to generate the location signals (e.g., via the control unit 140) being indicative of a constant location, generally different than the actual location of the mobile device. In some embodiments, the location data generation unit is configured and operable to generate the location signals being indicative of a moving location of the mobile device, e.g. resemble a route extending between two or more points during a predetermined period of time.

In a non-limiting experiment performed by the inventors, the following conditions were examined and results were confirmed:

the location data generation unit was operated to emit signals in the frequency range 1164-1610 MHz, up to +10 dBm signal power; as a result the signal from a GPS generator satellite was blocked both indoor and outdoor; GSM, Bluetooth and Wifi transceivers were not affected in the mobile device or other device with a 10 cm distance away; no location determination system of the other devices was affected.

Figure 5A:
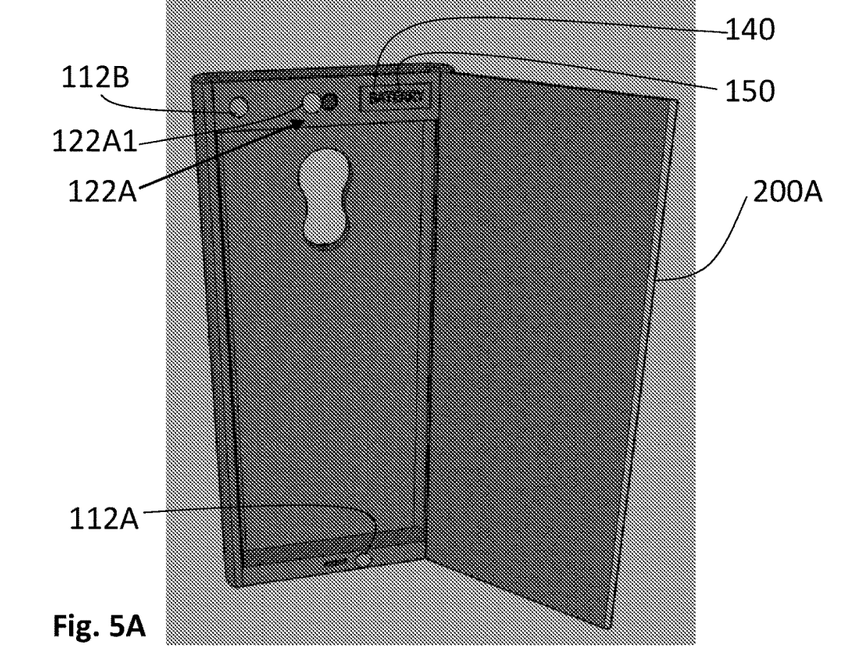
FIGS. 5A-5B illustrate a non-limiting example of a casing, for the mobile device, carrying a non-limiting example of the data protection system.
Figure 5B:
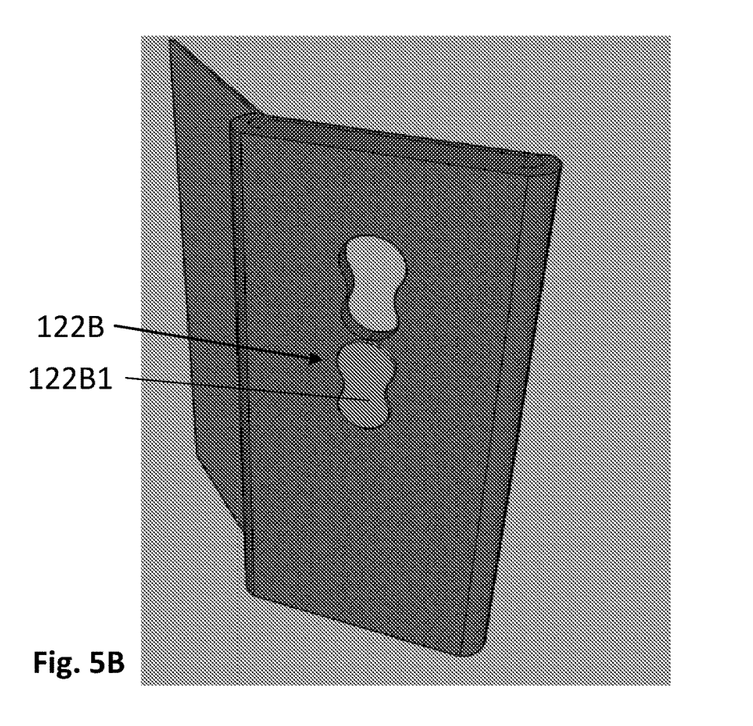

Reference is made to FIGS. 5A-5B showing a non-limiting example of a casing 200A, for the mobile device, carrying a non-limiting example of the data protection system. The casing 200A is intended for mounting on the mobile device and carries, in this non-limiting example, both of the ambient audio data protection system and the visual data protection system, integrated therein. As shown, the ambient audio data protection system includes two acoustic elements 112A and 112B located on the bottom and top of the case 200A respectively and intended to be in close proximity to the microphones of the specific mobile device when received within the casing 200A. Also, the casing carries the control unit 140 and the power supply unit 150 configured and operable as described above. As shown in FIG. 5A, illustrating the front side of the case 200A, a shutter element 122A is provided on the upper side and intended for selectively covering the front camera system of the mobile device. The shutter element is shown in its first position 122A1 uncovering the camera system and enabling the user to use it as needed. FIG. 5B illustrates the back side of the case 200A, a shutter element 122B is provided on the upper side and intended for selectively covering the back (main) camera system of the specific model of the mobile device. The shutter element is shown in its first position 122B1 uncovering the camera system and enabling the user to use it as needed.

As mentioned above, the casing and locations of the data protection system elements is adapted to the specific mobile device model, enabling optimal functionality for protecting the privacy of the user.

Figure 6:
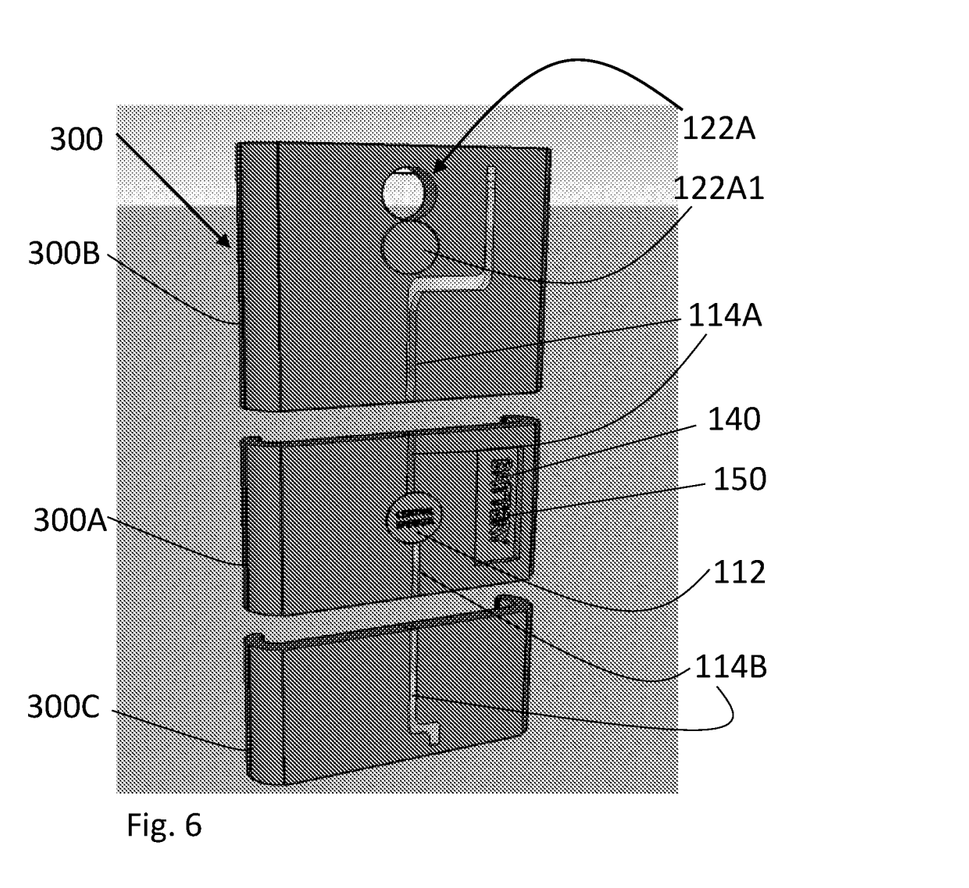
FIG. 6 illustrates another non-limiting example of a casing, for the mobile device, carrying a non-limiting example of the data protection system.

In FIG. 6 another non-limiting example of a casing 300, for the mobile device, carrying a non-limiting example of the data protection system, is shown. Also in this non-limiting example, both of the ambient audio data protection system and the visual data protection system are integrated in the casing 300, together with the control unit 140 and the power supply unit 150. In this example, to enable extra manufacturing flexibility, the casing 300 is divided into three parts, a middle, central part 300A, a top part 300B and a bottom part 300C. This configuration allows using the central part 300A as a universal part that can match a plurality of mobile devices, such that only the top and bottom parts are adapted to the specific mobile device's model.

In this example, the ambient audio data protection system is configured as in FIG. 2B above, where a central acoustic element 112 is carried by the central part 300A and connected to the microphones (not shown) on the device by audio channels 114A and 114B extending from the central part 300A to the top and bottom parts 300B and 300C, respectively, to reach points adjacent the microphones on the mobile device when received within the case 300.

The visual data protection system includes a shutter element 122A located on the back side of the top part 300B of the case and shown in its first open position 122A1 uncovering the camera system on the back of the mobile device.

The invention claimed is:

1. A data protection system configured to be mounted on a mobile device being external to said mobile device, the data protection system comprising:
   an ambient audio data protection system comprising one or more acoustic elements positioned in vicinity of one or more microphones of the mobile device and configured and operable to generate one or more audio signals; and
   a processing unit configured and operable to generate digital signals causing the ambient audio data protection system to generate the respective one or more audio signals;
   said data protection system being configured and operable for protecting privacy of a user of the mobile device, by selectively preventing said electronic device obtaining data indicative of surroundings of the device;
   wherein the data protection system comprises a sensory system configured for determining status of the mobile device and configured to determine that the mobile device is in an active call and to automatically deactivate the data protection system in response to determination that the mobile device is in an active call.

2. The data protection system according to claim 1, wherein said processing unit is configured to generate random noise signal and transfer the noise signal to the one or more acoustic elements to prevent isolating the ambient audio from overall audio signal collected by the one or more microphones of the mobile device.

3. The data protection system according to claim 1, wherein said ambient audio data protection system is configured and operable to generate the one or more audio signals being undiscernible by one or more individuals in vicinity of the mobile device.

4. The data protection system according to claim 1, wherein said ambient audio data protection system comprises the one or more acoustic elements each being located in a vicinity of at least one of the one or more microphones of the mobile device when the data protection system is mounted on the mobile device.

5. The data protection system according to claim 4, wherein each acoustic element and respective one or more microphones are located within an acoustic cell that is designed and configured to enable proper function of the one or more microphones when the ambient audio data protection system is deactivated, and amplify the audio signals emitted towards the one or more microphones, thereby enabling to keep the audio signals at low volume.

6. The data protection system according to claim 1, wherein said ambient audio data protection system comprises a central acoustic element configured to generate the one or more audio signals, and at least one audio channel extending from the central acoustic element and terminating in vicinity of at least one of the one or more microphones of the mobile device, the at least one audio channel being configured to transmit the one or more audio signals generated by the central acoustic element to the vicinity of the at least one of the one or more microphones of the mobile device.

7. The data protection system according to claim 1, wherein said ambient audio data protection system comprises a processing unit configured and operable to generate one or more digital signals causing the one or more acoustic elements to generate said one or more audio signals, the one or more digital signals control at least one of amplitude, frequency and phase of the one or more audio signals.

8. The data protection system according to claim 1, wherein said ambient audio data protection system is configured and operable to generate the one or more audio signals in a form of a random noise comprising at least one of random phase, random frequency, random amplitude and random sequence of the audio signal.

9. The data protection system according to claim 1, wherein said ambient audio data protection system is configured and operable to generate the audio signals including one or more frequencies corresponding to frequencies of human voice.

10. The data protection system according to claim 1, wherein said ambient audio data protection system is configured and operable to generate different audio signals through respective different acoustic elements such that each microphone of the mobile device is subjected to a different audio signal.

11. The data protection system according to claim 1, further configured for preventing obtaining the visual data originating from the surroundings, the data protection system further comprises at least one shutter element configured to selectively cover one or more camera systems of the mobile device and prevent the one or more camera systems from collecting images of surroundings of the mobile device, the at least one shutter element being displaceable between a first position in which it uncovers the one or more camera systems and a second position in which it covers the one or more camera systems.

12. The data protection system according to claim 1, wherein said data protection system is further configured for preventing obtaining the location data, the data protection system further comprises a location data generation unit configured to selectively generate location signals to be collected by location determination system of the mobile device, interfere with location determination signals received from a remote location data generator and prevent determining real location of the mobile device from overall location data signal collected by the location determination system of the mobile device.

13. The data protection system according to claim 1, further comprising one or more batteries comprising at least one of one or more replaceable batteries or one or more rechargeable batteries for powering one or more parts of the data protection system.

14. The data protection system according to claim 1, further comprising a power cord configured to connect one or more parts of the data protection system to a power source of the mobile device.

15. The data protection system according to claim 1, being modular and configurable to match a plurality of models of the mobile device.

16. A case configured to be mounted on a mobile device, the case comprising a data protection system comprising:
an ambient audio data protection system comprising one or more acoustic elements positioned in vicinity of one or more microphones of the mobile device and configured and operable to generate one or more audio signals,
a processing unit configured and operable to generate digital signals causing the ambient audio data protection system to generate the respective one or more audio signals;
said data protection system being configured and operable for protecting privacy of a user of the mobile device, by selectively preventing said electronic device obtaining data indicative of surroundings of the device;
wherein the case further comprises a sensory system configured for determining status of the mobile device and configured to determine that the mobile device is in an active call and to automatically deactivating the data protection system in response to determination that the mobile device is in an active call.

17. The case according to claim 16, comprising a central part configured to be attached to a central portion of the plurality of models of the mobile device, and at least one top part and at least one bottom part configured to attach to a single mobile device of the plurality of models of the mobile device.

18. The case according to claim 17, wherein said central part comprises the central acoustic element, and at least one of said at least one top part and at least one bottom part comprise(s) said at least one audio channel.

* * * * *